United States Patent [19]

Dewaegheneire

[11] Patent Number: 4,549,717
[45] Date of Patent: Oct. 29, 1985

[54] HEAT RESPONSIVE VALVE

[75] Inventor: Gabriël Dewaegheneire, Zwevegem, Belgium

[73] Assignee: Leuven Research & Development, Louvain, Belgium

[21] Appl. No.: 582,720

[22] Filed: Feb. 23, 1984

[30] Foreign Application Priority Data

Mar. 7, 1983 [LU] Luxembourg .................. 84677

[51] Int. Cl.⁴ ...................... F16K 35/00; F16K 17/38
[52] U.S. Cl. .................................. 251/111; 251/902; 137/522; 137/457; 137/468; 138/89
[58] Field of Search ............... 251/111, 101; 137/456, 137/457, 468, 522; 138/45, 89; 236/61, 101 D

[56] References Cited

U.S. PATENT DOCUMENTS

| | | | |
|---|---|---|---|
| 1,708,622 | 4/1929 | Hoffman | 236/61 |
| 1,848,031 | 3/1932 | Spencer. | |
| 2,048,387 | 7/1936 | Johnsen. | |
| 3,106,226 | 10/1963 | Machen | 138/45 |
| 3,367,362 | 2/1968 | Hoffman | 138/45 X |
| 3,417,768 | 12/1968 | Wasson | 236/61 X |
| 3,431,944 | 11/1969 | Sakuma | 138/45 |
| 4,227,646 | 10/1980 | Hart et al. | 236/101 D |
| 4,229,341 | 10/1980 | Yamaguchi et al. . | |
| 4,350,183 | 9/1982 | Holmes | 138/89 |

FOREIGN PATENT DOCUMENTS

| | | |
|---|---|---|
| 58451 | 8/1982 | European Pat. Off. . |
| 1019879 | 11/1957 | Fed. Rep. of Germany . |
| 2256358 | 7/1975 | France . |

*Primary Examiner*—Larry Jones
*Attorney, Agent, or Firm*—Shlesinger, Arkwright, Garvey & Fado

[57] ABSTRACT

A safety valve responding to overheating conditions of the surrounding atmosphere, more specifically a combustion gas inlet valve that closes when a fire declares. The valve uses a shape-memory element for detection and command. For the latter function it must be inside the valve, at the expense of sufficiently rapid detection of external temperature. This problem is solved by using a shape-memory element that is in close contact with the valve housing, e.g. countersunk in a groove in the internal wall of the valve housing, for facilitating conduction heat transfer.

20 Claims, 6 Drawing Figures

HEAT RESPONSIVE VALVE

BACKGROUND OF THE INVENTION

The invention relates to a safety valve adapted to respond to overheating of the external athmosphere surrounding said valve, e.g. in case of fire. The possible responses include the opening of said valve, e.g. when a valve intended for liquids is connected to an instrument for sprinkling the seat of a fire, as well as the closing of the valve, e.g. when the valve is a combustion gas valve fitted in the entrance pipe of a building.

Such valve will, in general terms, comprise a housing, e.g. tube-shaped, separating an internal passageway from an external athmosphere outside the housing, and also comprises an obturation body movable between an open position and an obturating position (i.e. a position in which said passageway is kept open, respectively closed by said obturation body), and further also comprises a control mechanism for said obturation body. The said body may have the form of a piston which is slidable inside a cylinder having one or more openings in the wall which are obturated or not by the piston in accordance with the position of the latter. It also may have the form of a ball or flap conforming to the valve seat in order to close the passageway when pushed against the valve-seat, or it may have any other form.

In such a valve, the position of the obturation body will be directed by a control mechanism which is based on a shape memory element, i.e. a mechanism by which the opening and/or closing movement is triggered by a signal delivered by a shape memory alloy element. This mechanism comprises one or more mechanical, fluidic, magnetic and/or electromagnetic elements, the function of which is to produce the movement of the obturation body when triggered by the shape-memory alloy element. Such an alloy, as well known, can, if properly prepared, exhibit different shapes in the warm and cold states, and provides the advantage that it produces sufficient energy to move the movable parts of the temperature command or control systems. This permits a simplification of these systems and avoids, if necessary, the use of electric components. For the abovementioned heat responsive valves, several control mechanisms can be conceived, depending upon whether the valve is to open or close in overheating conditions, whether it is permitted to open or to close again after the overheating conditions have ceased to exist, whether it shall open or close in the same or in the opposite sense as the pressure of the fluid, whether the shape memory alloy works as an element which pushes the obturation body into movement, or as a bolt element which temporarily prevents the movement of the obturation body which movement is then induced by another mechanical element, etc. In its simplest embodiment, the control mechanism may consist of only the shape memory alloy element which provides the function of a heat sensitive element, together with the function of producing the movement of the obturation body.

OBJECTS AND SUMMARY OF THE INVENTION

However, for valves which must respond to an external temperature, the response time is rather long because the shape memory alloy element is located inside the valve. This is due to the fact that it must be movable and command the interior of the valve. It is an object of the invention to sensibly improve the response time of these valves to overheating of the external athmosphere.

According to the invention, the shape memory alloy element is partially fixed in the valve housing in order to provide with a substantial part of its surface, a heat conductive contact with said housing.

The invention is based on the idea that, despite the fact that the shape memory alloy element has to be a movable element capable of inducing movement, there is nothing that prevents it from being used only partially as such, and that another part of it, fixed in the housing, can be used as a heat sensor which extracts the heat from the interior of the housing and transmits this heat to the movable part by means of conduction. In order to extract this heat, it is necessary that the valve housing and the fixed part of the shape memory alloy element form a good heat conducting contact. Therefore, this fixed part is mounted in such a way that a substantial part of the total surface of the element, preferably at least 10%, is in heat conducting contact with the valve housing. Higher rates, e.g. between 10 and 80%, will improve the sensitivity of the valve.

The shape memory alloy element will, preferably, have an elongated form and, for a part of its length, be fixedly, i.e. without any play, disposed within a groove in the internal wall of the valve housing. This facilitates the manufacture of the valve because the shape memory alloy element can be introduced and mounted by pushing it into the groove where it remains clamped.

DESCRIPTION OF THE DRAWINGS

The invention will now be explained in greater detail whereby reference is made to some drawings, shown by way of example only and in which.

DESCRIPTION OF THE INVENTION

Figure 1:
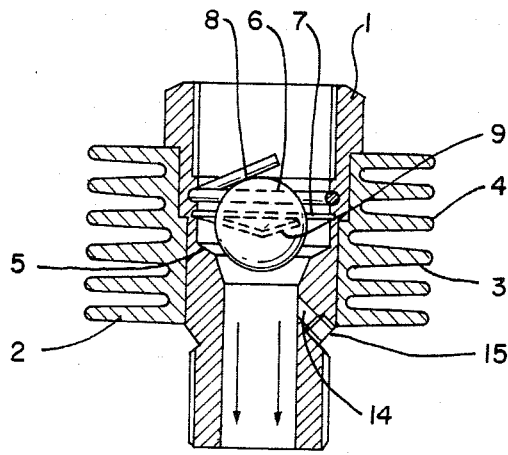
FIG. 1 is a cross-sectional view of a gas valve according to the invention and in open position.

As best shown in FIG. 1, the valve of the invention comprises a housing consisting of a steel tube 1 surrounded by an aluminium ring 2, the internal surface of which is in close contact with the external surface of the tube, e.g. by conical clamping. The external surface of the ring has cooling wings 3. The tips 4 of the wings may all be located on a, cylindrical surface (as is the case with the circular disk shaped wings in the figure), or on a, conical surface in order to allow draughts of the surrounding athmosphere, moving in the axial sense of the tube, to penetrate more easily between the cooling wings.

Figure 4:
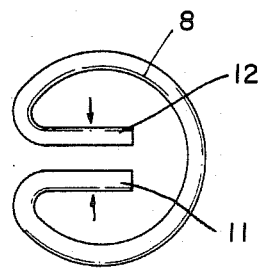
FIG. 4 shows the form of the shape memory alloy element used in the valve.
Figure 5:
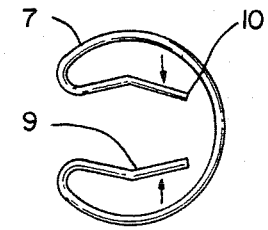
FIG. 5 shows the form of a spring, used in the valve in order to provide the obturation body with a bistable nature.

The internal wall of the tube 1 defines a passageway and a valve seat 5, which cooperates with a ball 6 which provides an obturation body movable between an open position (FIG. 1) and a closed position in which the passageway is obturated by the ball. (FIG. 2) The control mechanism comprises a stainless steel spring 7 (FIG. 5) and a wire piece 8 made of a shape memory alloy (FIG. 4) comprising, preferably, 70.1% Cu, 25.6% Zn and 4.3% Al. The spring 7 and the wire piece 8 each have the form of a circular arc exceeding 180° with ends thereof bent inwardly into the circle. The circular-arc-shaped parts of both the spring 7 and the wire piece 8 are positioned within and clamped to the wall of a groove in the internal wallof the valve housing. Ends 9 and 10 and ends 11 and 12 of, respectively, spring 7 and wire piece 8, remain movable. This form facilitates their mounting, because, pressing the ends together in the direction of the arrows (FIGS. 4 and 5), reduces the radius of the circle, and this permits introduction and fixation in the corresponding groove. The shape of the groove wall in which the wire piece 8 is positioned, corresponds very accurately with the external surface of the wire piece, so that a close contact is achieved providing good conductive heat transfer over a surface area that is as large as possible.

Figure 2:
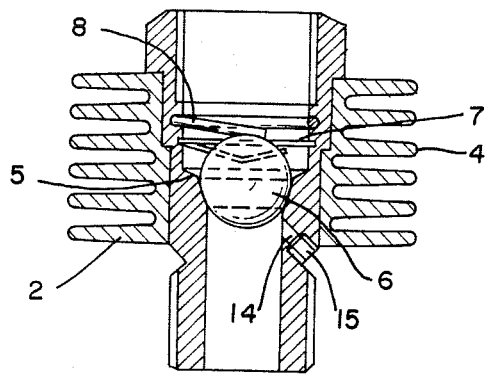
FIG. 2 is the same cross-sectional view of the same gas valve in closed position.
Figure 3:
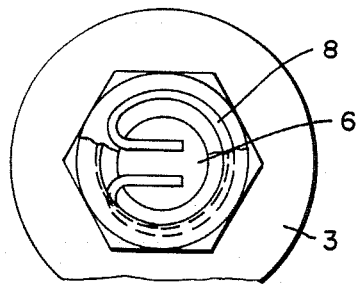
FIG. 3 is a view in axial direction.

In the open position (FIG. 1), the ball 6 is in a stable position, slightly clamped between the two ends 9 and 10 of spring 7 and both ends 11 and 12 of the shape memory alloy wire piece 8. When the ball is pushed in the direction of valve seat 5, it pushes both ends 9 and 10 of spring 7 away from each other, which generates a force opposed to this movement. When, however, the ball is pushed sufficiently far, both ends close again and generate a force in the same direction as the movement so that the ball continues its movement towards the closed position (FIG. 2). In this position, the ball is slightly clamped between spring 7 and valve seat 5. In this way, the spring 7 provides the ball with a bistable nature; there are only two stable positions, the open and the closed position.

The wire-shaped shape memory alloy element 8 has been prepared, as is well known, in order to have one particular shape in the "cold state" (FIG. 1) and another shape in the "warm state" (FIG. 2). By "cold" or "warm" state is meant that state in which the element is at a temperature below, respectively above, the temperature range of martensitic transformation of the alloy. The shape in the cold state, as in FIG. 1, is one where the two ends 11 and 12 of the piece of wire 8 are in a position averted from the valve seat 5. The shape in the warm state as in FIG. 2, is one where the two ends are in a position directed toward the valve seat 5.

In operation, the valve is initially at ambient temperature and in the open position, as shown in the FIG. 1, with the ball in open position and the wire piece 8 in its cold state shape. Upon the arrival of a hot draught of air or fumes passing between the wings 3, these wings start to heat up by convection and transmit the heat through the valve housing, and by conduction to the wire piece 8. When this wire piece reaches its transformation temperature, it changes its shape and pushes the ball 6 by means of the two ends 11 and 12 in the direction of valve seat 5. The ball then jumps, under the influence of spring 7, to the closed position shown in FIG. 2. (With the composition mentioned for this example, this happens at 55° C.) Afterwards, when the wire piece 8 cools down below the transformation temperature, the wire piece will return to its cold state shape, shown in FIG. 1, but the ball 6 will not follow this movement but will remain clamped against the valve seat 5 under the influence of spring 7. The valve will, consequently, stay closed when the overheating condition disappears. Opening the valve again will require human intervention. For this purpose, the valve seat includes a perforation 14 obturated by a screw 15. The axial direction of the perforation points towards the ball 6. In order to open the valve again, the screw 15 is unscrewed and a stick is introduced into the perforation in order to push the ball through spring 7 towards the open position.

Figure 6:
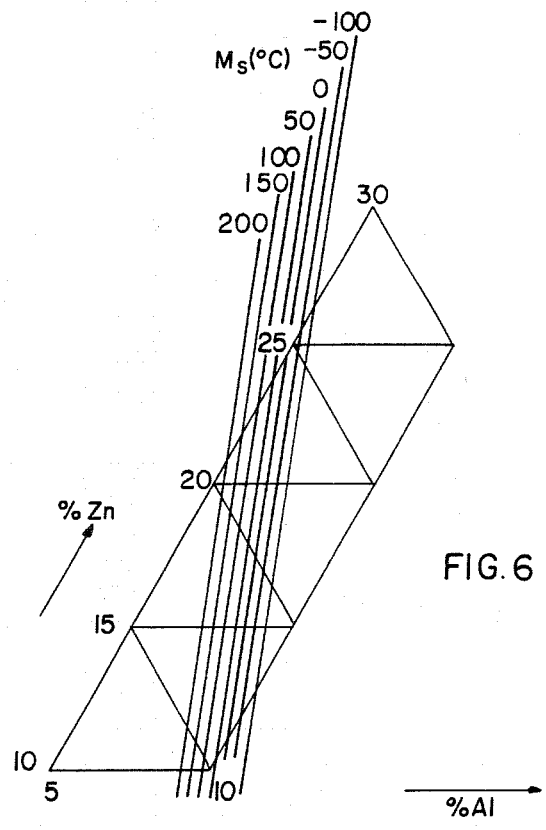
FIG. 6 is a ternary diagram showing the transition temperature of a Cu-Al-Zn shape memory alloy, as a function of the alloy composition.

The invention is limited neither to the composition of the shape memory alloy element nor to the chosen transition temperature. The latter depends on the application: on the "normal" temperature at which the valve shall be in its normal position, an on the "warm" temperature at which the valve is expected to respond. For this purpose, it is necessary that the shape memory alloy be in a martensitic state at the normal temperature, and in an austenitic state at the warm temperature. The alloy is chosen on the basis of these requirements. Preferably, a Cu-Al-Zn alloy is selected having the $\beta$-structure in the martensitic state, whose transition temperature as a function of the composition is given in FIG. 6. The temperature $M_s$ in this figure is the starting temperature of the martensitic state and will not exactly coincide with the response temperature of the valve, but is indicative of this temperature. This will make it possible to choose the corresponding composition. For safety in anti-fire applications, a response temperature between 50° and 150° C. can, consequently, be chosen. This corresponds with an $M_s$-temperature which, in general, ranges between 40° and 140° C. Other shape-memory alloys can, of course, be used, such as a Cu-Zn, Au-Cd, Ni-Ti alloy or other ternay or quaternary alloys of Fe, Ni, Cr, Co or Mn producing a shape memory effect. In order to give the alloy the property of deformation in case of direct and inverse martensitic transformation, the alloy should also be submitted to a preparatory treatment: namely, repeated deformation of the element body in its martensitic state into its cold shape, and in the austenitic state into its warm shape.

It is clear that the element 8 need not necessarily be wire-shaped. Although this shape is particularly practical for manufacturing and mounting, elements having other shapes are conceivable, e.g. a strip, insofar as it can be mounted in close contact with the valve housing over a sufficient part of its surface. Nor is it necessary that the wire, or such a strip, be countersunk in a groove in the internal wall of the valve housing. Constructions are conceivable in which the whole wire or element is located inside the valve housing, except the movable part which has to trigger the movement of the valve. Furthermore, it is not necessary that the "shape memory alloy element" be composed, in its entirety, of a shape memory alloy. It is only necessary that the part which must change its shape be of such alloy, but this is not necessary for the other part, insofar as the body is coherent.

The invention is not limited either to the kind of control mechanism for the obturation body. The presence of spring 7 in the example above is necessary when it is desired to provide the ball 6, or, in general terms, the obturation body, with a bistable nature, i.e. the obturation body at rest has only two stable positions. But this can be obtained with other types of springs or mechanisms, without departing from the scope of the present invention. On the other hand, the principle of the invention can be used in systems in which the obturation body must not necessarily have a bistable nature, but where the opening and closing is achieved in a more progressive way, insofar as the heat transmission towards the shape memory element occurs in the indicated way to produce the signal that triggers the movement.

Moreover, it is possible to use in the control mechanism a movement-producing steel spring, the release of which is prevented by a shape memory element functioning as a bolt. When this bolt, mounted according to the invention, reaches the transformation temperature, it takes a shape which no longer prevents the release of the high-energy movement-producing spring, which can then open a fire sprinkler valve against the pressure of the liquid, for example. Here, the shape memory alloy has the function of a bolt, whereas, in the example of FIG. 1, it has the function of the movement-producing element, but the invention is applicable in both cases.

The heat transmission from the external atmosphere towards the valve housing is improved by the convection wings 3. However, it is not necessary to use the wings or a ring-shaped piece comprising the wings as shown in FIG. 1. It is sufficient to provide the external surface with an undulated or unregular form that promotes heat transmission by convection, i.e. a surface having an area that is at least twice the minimum necessary for a smooth surface.

I claim:

1. A valve responsive to the temperature of the surrounding medium, comprising:
   (a) a generally tubular body having a passageway therethrough and said body comprised of a heat conducting material and being adapted for connection to fluid supply means;
   (b) a valve seat disposed in said passageway;
   (c) obturation means disposed in said passageway and being movable between an open position spaced from said seat permitting fluid flow through said passageway and a closed position engaged with said seat preventing fluid flow through said passageway;
   (d) shape memory element means having first and second temperature induced shapes disposed within said passageway and having a portion fixed to the wall of said passageway so that the temperature of the medium surrounding said body is thermally conducted to said shape memory element means for heating said shape memory element means to a temperature associated with the temperature of the medium surrounding said body;
   (e) said shape memory element means assuming said first shape when the temperature of said shape memory element means is less than a preselected temperature and said first shape permitting said obturation means to be disposed in one of said open and closed positions;
   (f) said shape memory element means assuming said second shape when the temperature of said shape element means exceeds a preselected temperature and said shape memory element means having a portion engagable with said obturation means for moving said obturation means to the other one of said open and closed positions when said second shape is assumed; and,
   (g) spring means including cooperating arcuate portions engaged with said obturation means for maintaining said obturation means in said open and closed positions whereby movement of said obturation means from one of said positions causes said arcuate portions to flex and to thereby permit movement to the other one of said positions and to therein be retained.

2. The valve as defined in claim 1, wherein:
   (a) said spring means being arcuate in plan and subtending an arc exceeding 180°; and,
   (b) said spring means including first and second cooperating associated ends extending toward the arc of said spring means so that initial movement of said obturation means toward said seat causes said ends to move apart and to thereby resist movement of said obturation means and additional movement of said obturation means causes said ends to move toward each other and to thereby assist movement of said obturation means toward said seat.

3. The valve as defined in claim 1, wherein:
   (a) said spring means being adjacent said shape memory element means.

4. The valve as defined in claim 3, wherein:
   (a) said spring means being downstream of said shape memory element means.

5. The valve as defined in claim 1, wherein:
   (a) said shape memory element means being generally circular in plan and subtending an arc exceeding 180°; and,
   (b) said shape memory element means including ends extending toward the arc of said shape memory element means and said ends being engageable with said obturation means for moving said obturation means.

6. The valve as defined in claim 5, wherein:
   (a) first and second spaced grooves being disposed in the wall of said passageway and said first groove being upstream of said second groove; and,
   (b) said shape memory element means being seated in said first groove and said spring means being received in said second groove.

7. The valve as defined in claim 1, wherein:
   (a) at least 10% of the surface area of said shape memory element means being fixed to the wall of said passageway.

8. The valve as defined in claim 1, wherein:
   (a) at least a first groove being disposed in the wall of said passageway; and,
   (b) one of said shape memory element means and said spring means being seated in said groove.

9. The valve as defined in claim 1, wherein:
   (a) means being associated with said body for improving heat transmission from the medium surrounding said body to said shape memory element means.

10. The valve as defined in claim 9, wherein:
    (a) said improving means including a plurality of convection wings extending outwardly from said body.

11. The valve as defined in claim 1, further comprising:
    (a) an aperture in said body communicating with said passageway proximate said seat for permitting access to said obturation means when in said closed position in order to permit resetting of said obturation means to said open position.

12. The valve as defined in claim 1, wherein:
    (a) said obturation means including a ball.

13. The valve as defined in claim 1, wherein:
    (a) said shape memory element means comprising an alloy of copper, zinc and aluminum.

14. A safety valve, comprising:
    (a) a generally tubular body having a passageway therethrough and said body comprised of a heat conducting material and being adapted for connection to fluid supply means;
    (b) a valve seat disposed in said passageway;

(c) obturation means disposed in said passageway and being movable between an open position spaced from said seat permitting fluid flow through said passageway and a closed position engaged with said seat preventing fluid flow through said passageway;

(d) shape memory element means having first and second temperature induced shapes disposed within said passageway and having a portion fixed to the wall of said passageway so that the temperature of the medium surrounding said body is thermally conducted to said shape memory element means for heating said shape memory element means to a temperature associated with the temperature of the medium surrounding said body;

(e) said shape memory element means assuming said first shape when the temperature of said shape memory element means is less than a preselected temperature and said first shape permitting said obturation means to be disposed in one of said open and closed positions;

(f) said shape memory element means assuming said second shape when the temperature of said shape element means exceeds a preselected temperature and said shape memory element means having a portion engagable with said obturation means for moving said obturation means to the other one of said open and closed positions when said second shape is assumed; and, (g) spring means operably positioned in said passageway and having cooperating adjacently disposed arcuate portions engageable with said obturaion means so that movement of said obturation means from one of said positions to the other of said positions is initially resisted by said arcuate portions and further movement thereof causes said arcuate portions to be moved apart a substantial distance and to thereby assist movement of said obturation means from said one position to said other position.

15. The valve as defined in claim 14, wherein:
(a) at least 10% of the surface area of said shaped memory element means being fixed to the wall of said passageway.

16. The valve as defined in claim 14, wherein:
(a) said shape memory element means being generally circular in plan and subtending an arc exceeding 180° degrees; and,
(b) said shape memory element means including aligned ends extending toward the arc of said shape memory element means and said ends being engagable with said obturation means for moving said obturation means.

17. The valve as defined in claim 16, wherein:
(a) the arc of said shape memory element means being generally planar and said ends extending upstream of the arc when is said first position and extending downstream of the arc when in said second position.

18. The valve as defined in claim 14, wherein:
(a) first and second axially spaced grooves being disposed in the wall of said passageway and said first groove being upstream of said second groove; and,
(b) said shape memory element means being seated in said first groove and said spring means being received in said second groove.

19. The valve as defined in claim 14, wherein:
(a) a plurality of convection wings extending outwardly from said body for improving heat transmission from the medium surrounding said body to said shape memory element means.

20. The valve as defined in claim 14, wherein:
(a) an aperture being disposed through said body proximate said seat for permitting access to said obturation means when in said closed position in order to permit resetting of said valve by movement of said obturation means to said open position.

* * * * *